(12) United States Patent
Walker et al.

(10) Patent No.: US 8,292,785 B2
(45) Date of Patent: Oct. 23, 2012

(54) CONTROL OF TORQUE DIRECTION TRANSITION IN A POWERSHIFT TRANSMISSION

(75) Inventors: Ralph S. Walker, Livonia, MI (US); Shawn A. Holland, Livonia, MI (US); Terry G. Feldpausch, Carleton, MI (US); Bradley D. Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 12/795,800

(22) Filed: Jun. 8, 2010

(65) Prior Publication Data

US 2011/0300991 A1 Dec. 8, 2011

(51) Int. Cl.
*B60W 10/02* (2006.01)
*B60W 10/06* (2006.01)

(52) U.S. Cl. ........................................ 477/176; 477/180

(58) Field of Classification Search .................. 477/176, 477/180, 181
See application file for complete search history.

(56) References Cited

U.S. PATENT DOCUMENTS

| | | | |
|---|---|---|---|
| 5,531,302 A | 7/1996 | Koenig et al. | |
| 5,535,863 A | 7/1996 | Vukovich et al. | |
| 6,832,978 B2 | 12/2004 | Buchanan et al. | |
| 6,991,585 B2 | 1/2006 | Colvin et al. | |
| 7,455,619 B2 | 11/2008 | Jiang | |
| 7,597,650 B2 | 10/2009 | Rzepecki, II et al. | |
| 2005/0288147 A1* | 12/2005 | Endo et al. | 477/5 |
| 2007/0265137 A1* | 11/2007 | Jiang | 477/176 |

* cited by examiner

*Primary Examiner* — Edwin A Young
(74) *Attorney, Agent, or Firm* — David B. Kelley; MacMillan, Sobanski & Todd, LLC

(57) ABSTRACT

A method for controlling a torque direction transition in a dual clutch transmission includes decreasing a torque capacity of a transmission input clutch when clutch slip reaches a target slip during a power-off condition, producing a subsequent power-on condition, and increasing torque capacity of said clutch when clutch slip reaches a second target slip.

20 Claims, 4 Drawing Sheets

CONTROL OF TORQUE DIRECTION TRANSITION IN A POWERSHIFT TRANSMISSION

BACKGROUND OF THE INVENTION

1. Field of the Invention

This invention relates generally to a vehicle powertrain, and, in particular, to control of a transmission having no torque converter during a power-off to power-on transition.

2. Description of the Prior Art

A powershift transmission is a geared mechanism employing two input clutches used to produce multiple gear ratios in forward drive and reverse drive. It transmits power continuously using synchronized clutch-to-clutch shifts. A dual clutch transmission (DCT) has no torque converter The transmission incorporates gearing arranged in a dual layshaft configuration between the transmission input and its output. One input clutch transmits torque between the input and a first layshaft associated with even-numbered gears; the other input clutch transmits torque between the transmission input and a second layshaft associated with odd-numbered gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

During a vehicle launch condition in a conventional vehicle whose powertrain includes a powershift transmission, the engine and transmission are concurrently controlled in a coordinated manner to provide acceptable vehicle launch performance. In a powershift transmission vehicle application, providing consistent and acceptable vehicle launch performance can be a rather difficult control problem due to the lack of a torque converter. During a vehicle launch condition in this type of vehicle application, the torque capacity of the transmission clutch and slip across the clutch are carefully controlled in coordination with the engine torque to provide the desired vehicle response.

During a power-off to power-on transition, if torque capacity is present at the active input clutch, a driveline disturbance due to clutch stick is likely to occur. Yet torque transmitting capacity through that clutch is required to prevent driveline disturbance associated with synchronizer engagements. Therefore, a need exists in the industry for a control that avoids driveline disturbance due to clutch stick during power-off to power-on transitions while the torque capacity of the active or oncoming input clutch is not zero.

SUMMARY OF THE INVENTION

A method for controlling a torque direction transition in a dual clutch transmission includes decreasing a torque capacity of a transmission input clutch when clutch slip reaches a target slip during a power-off condition, producing a subsequent power-on condition, and increasing torque capacity of said clutch when clutch slip reaches a second target slip.

The control avoids driveline disturbance due to clutch stick during power-off to power-on transitions while the torque capacity of the active, oncoming input clutch is present.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
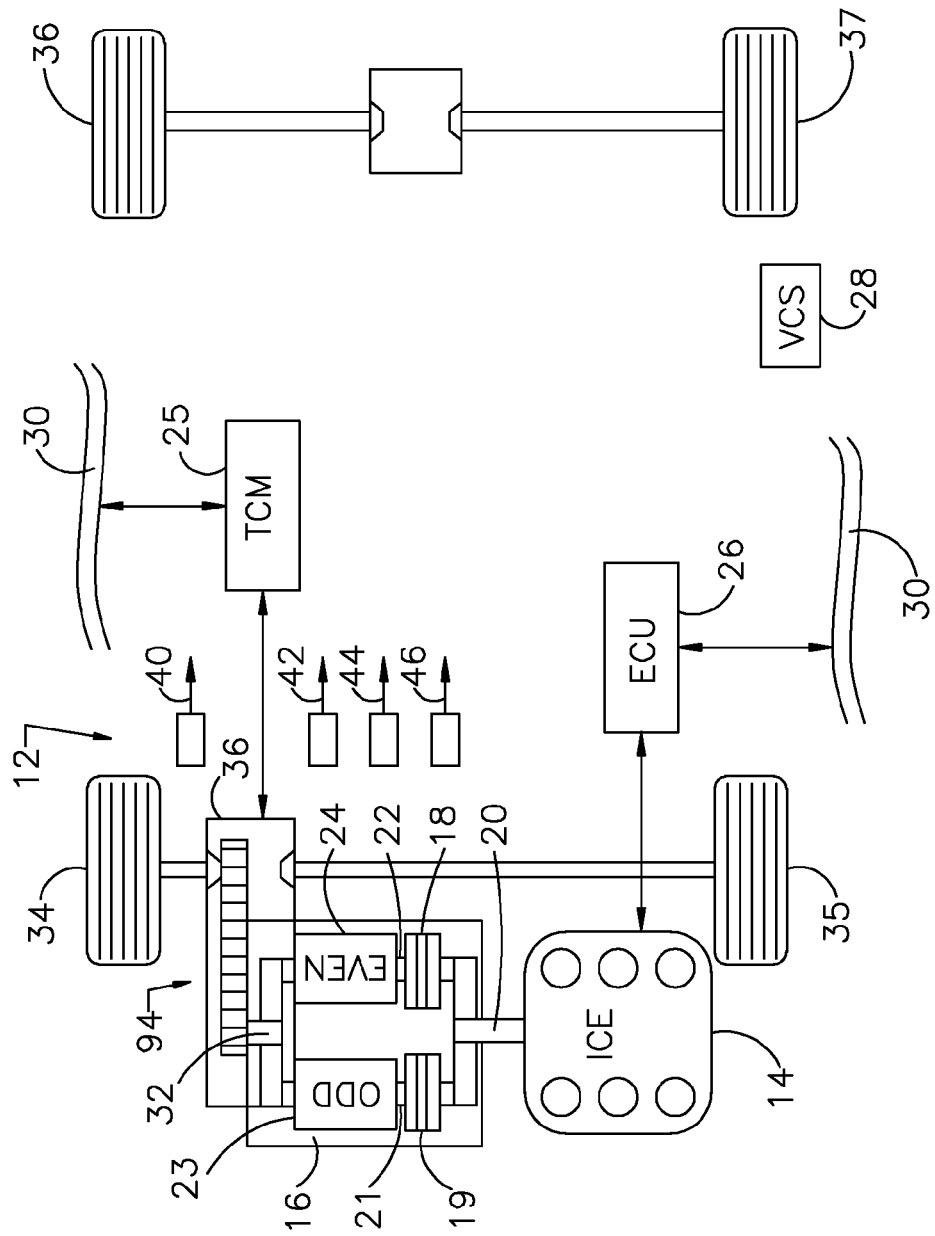
FIG. 1 is a schematic diagram of a vehicle powertrain, to which the torque direction transition control can be applied.

As shown in FIG. 1, a vehicle powertrain 12 includes an engine 14, such as a diesel or gasoline engine; and a transmission 16, preferably a powershift transmission having two input clutches but no torque converter, each clutch transmitting power to a respective layshaft. A powershift transmission is sometimes referred to as a dual clutch transmission.

The input clutches 18, 19 alternately connect shaft 20 to transmission inputs 21, 22 to the odd-numbered gears 23 and even-numbered gears 24, respectively. An electronic transmission control module (TCM) 25 controls the input clutches and gearbox state through command signals to servos that actuate the input clutches 18, 19 and gearbox shift forks and synchronizers. An electronic engine control module (ECU) 26 controls operation of engine 14. A vehicle control system (VCS) 28, issues control commands to the TCM and ECM carried on a communication bus 30. Each of the TCM 25, ECM 26 and VCS 28 includes a microprocessor accessible to electronic memory and containing control algorithms expressed in computer code, which are executed repeatedly at frequent intervals. The engine 14 provides vehicle propulsion by transmitting torque through transmission 16 to driven vehicle wheels 34, 35. Wheels 36, 37 are not driven.

The torque transmitting capacity of clutches 18, 19 varies in accordance with actuation of a servo under control of the TCM 25. Preferably each input clutch 18, 19 is actuated by a respective electric motor. The shaft of a first motor is connected to the plates of clutch 18, and the angular position of that shaft determines the torque transmitting capacity of clutch 18. Similarly, the shaft of a second motor is connected to the plates of clutch 19, and the angular position of that shaft determines the torque transmitting capacity of clutch 19. Alternatively, each clutch servo can be hydraulically actuated such that the torque capacity of each input clutch 18, 19 varies with a variable magnitude of hydraulic pressure supplied to the respective clutch.

Engine crankshaft torque varies in accordance with control signals sent to the engine from the ECU 26 in response to demanded wheel torque produced by the vehicle operator. Input signals produced by respective sensors representing speed 40 of input shaft 20, speed 42 of input 21, speed 44 of input 22, and current transmission gear 46 are transmitted on bus 30 to the TCM 25, ECU 26 and VCS 28. Slip across the active input clutch 18, 19 is continually monitored and determined from speed signals 40, 42, 44 by TCM 25.

Figure 2:
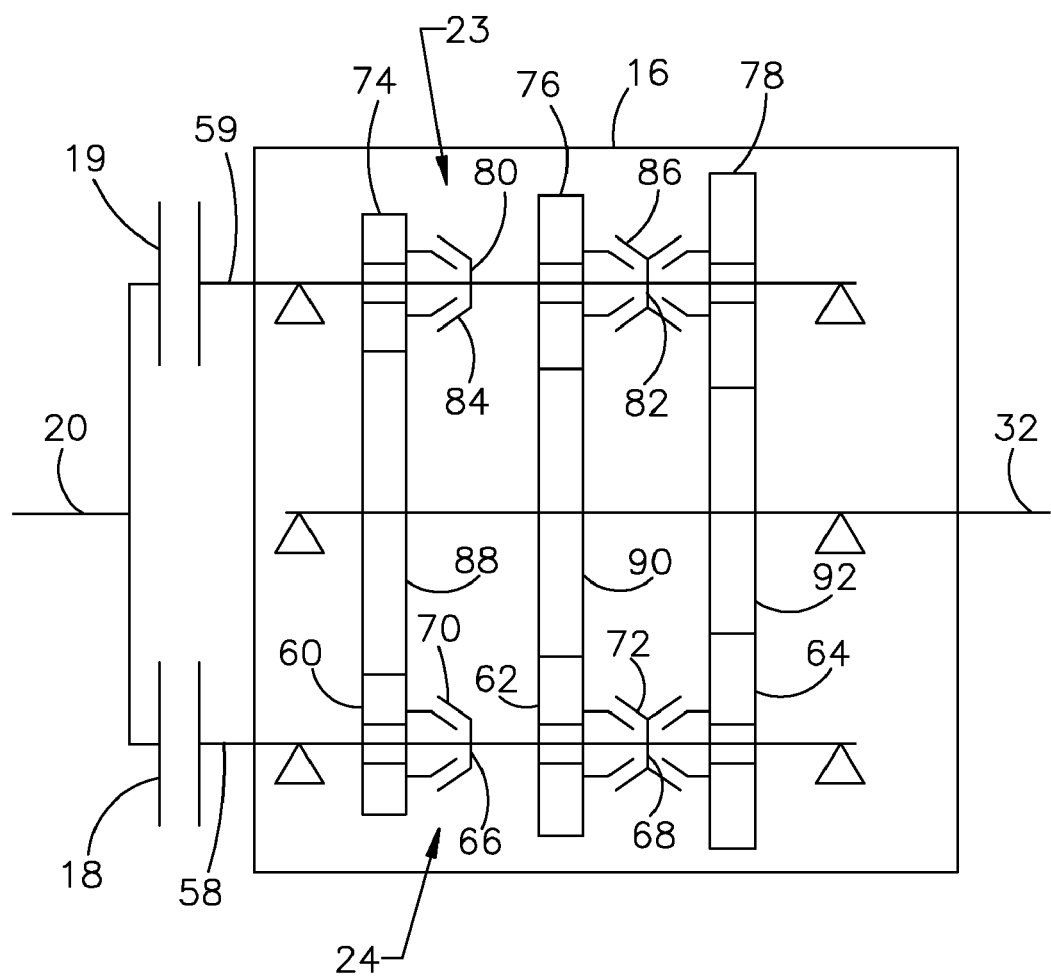
FIG. 2 is a schematic diagram showing details of a powershift transmission.

FIG. 2 illustrates details of a powershift transmission 16 including input clutch 18, which selective connects the input 20 of transmission 16 alternately to the even-numbered gears 24 associated with a first layshaft 58, and input clutch 19, which selective connects the input 20 alternately to the odd-numbered gears 23 associated with a second layshaft 59.

Layshaft 60 supports pinions 60, 62, 64, which are each journalled on shaft 58, and couplers 66, 68, which are secured to shaft 58. Pinions 60, 62, 64 are associated respectively with the second, fourth and sixth gears. Coupler 66 includes a sleeve 70, which can be moved leftward to engage pinion 60 and driveably connect pinion 60 to shaft 58. Coupler 68 includes a sleeve 72, which can be moved leftward to engage pinion and driveably connect pinion to shaft 58, and can be moved rightward to engage pinion 64 and driveably connect pinion 64 to shaft 58.

Layshaft 59 supports pinions 74, 76, 78, which are each journalled on shaft 59, and couplers 80, 82, which are secured to shaft 59. Pinions 74, 76, 78 are associated respectively with the first, third and fifth gears. Coupler 80 includes a sleeve 84, which can be moved leftward to engage pinion 74 and driveably connect pinion 74 to shaft 59. Coupler 82 includes a sleeve 86, which can be moved leftward to engage pinion 76 and driveably connect pinion 76 to shaft 59, and can be moved rightward to engage pinion 78 and driveably connect pinion 78 to shaft 59.

Transmission output 32 supports gears 88, 90, 92, which are each secured to shaft 32. Gear 88 meshes with pinions 60 and 74. Gear 90 meshes with pinions 62 and 76. Gear 92 meshes with pinions 64 and 78.

Couplers 66, 68, 80 and 82 may be synchronizers, or dog clutches or a combination of these. Although operation of the transmission 16 is described with reference to forward drive only, the transmission can produce reverse drive by incorporating a reverse idler gear in one of the lower gear power paths and a reverse coupler for engaging reverse drive. One of the input clutches 18, 19 would be engaged when reverse drive operation is selected.

During a power-off condition engine 14 produces substantially no wheel torque, the vehicle is coasting and the wheels 34, 35 transmit power to the engine 14 through the final drive 94, transmission 16, transmission inputs 21, 22, at least on of the clutches 18, 19, and input shaft 20. During a power-on condition engine 14 produces wheel torque and transmits power to the vehicle wheels 34, 35 through the input shaft 20, at least one of the clutches 18, 19, transmission 16, and final drive 94.

The control strategy is description with reference to a power-off to power-on transition, in which input clutch 19 transmits power from the engine 14 to the input 21, transmission 16 and wheels 34, 35. Slip across clutch 19 is generally negative during a power-off condition, which is a negative torque condition. Slip across clutch 19 is generally positive during a power-on condition, which is a positive torque condition.

Figure 3:
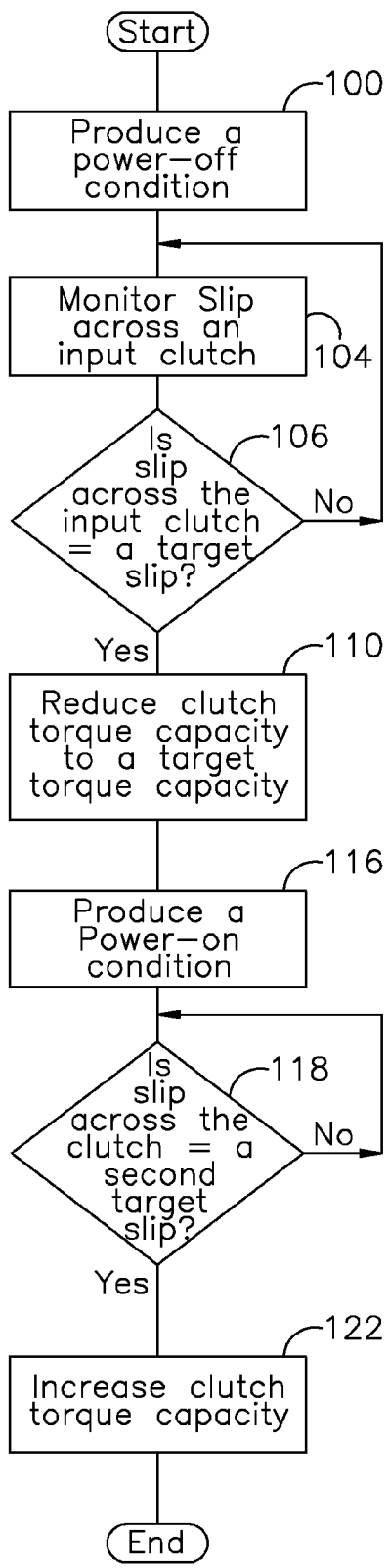
FIG. 3 is a diagram illustrating the steps of a method for controlling a torque direction transition.
Figure 4:
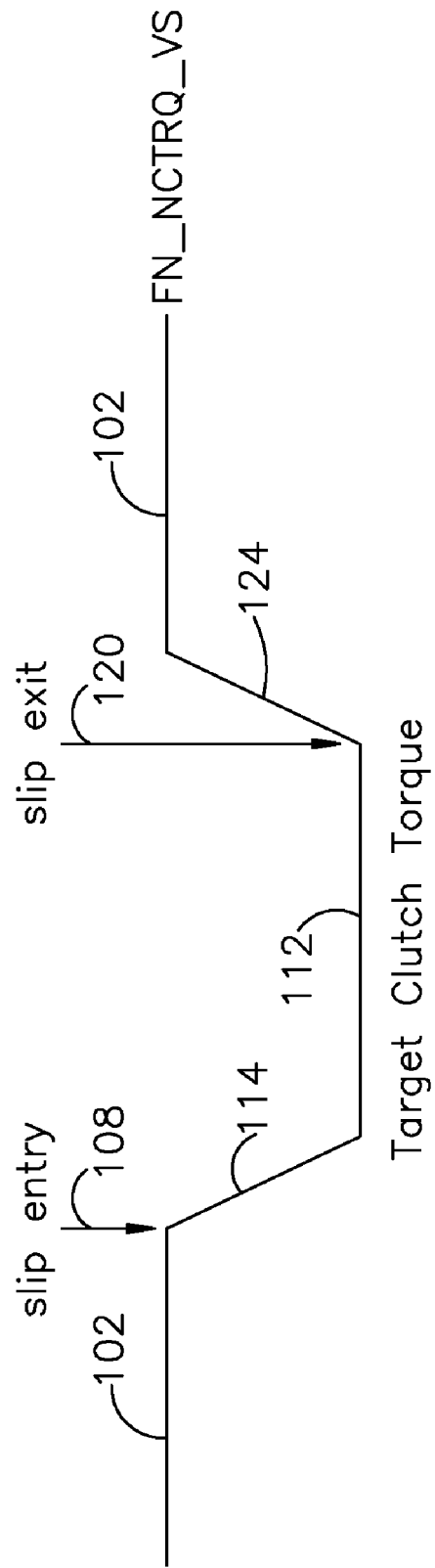
FIG. 4 is a graph that shows the variation with time of clutch torque capacity during the torque direction transition.

The steps of an algorithm for controlling a torque direction transition in the powertrain 12 are shown in the method steps diagram of FIG. 3. FIG. 4 shows graphically the changes on torque capacity of clutch 19.

At step 100 a power-off condition is produced, in which the wheels 34, transmit power to the engine 14 and the torque capacity of clutch 19 is at a desired magnitude 102.

At step 104 slip across clutch 19 is monitored, i.e., the difference in speed between speed of input shaft 20 and the speed of input 21 is monitored continually and sampled periodically.

At step 106 a test is made to determine whether slip across clutch 19 reaches a predetermined target slip 108. Preferably the target slip 108 is a negative slip approaching 0 rpm.

If the result of test 106 is logically true, at step 110 the torque transmitting capacity of clutch 19 is reduced to a target torque capacity 112, a magnitude that is low enough to avoid inducing driveline disturbances. Preferably the torque capacity reduction changes linearly with time along a ramp 114. If the result of test 106 is false, control returns to step 104.

At step 116 a transition from the power-off to a power-on condition occurs.

At step 118 a test is made to determine whether slip across clutch 19 reaches a second target slip 120. If the result of test 118 is true, at step 122 the target torque capacity 112 of clutch 19 is increased to the desired torque capacity 102, or to a second desired clutch torque capacity. Preferably the clutch torque capacity increase changes linearly with time along a ramp 124, whose slope may differ from that of ramp 114.

If the result of test 118 is false, step 118 is repeated.

In accordance with the provisions of the patent statutes, the preferred embodiment has been described. However, it should be noted that the alternate embodiments can be practiced otherwise than as specifically illustrated and described.

The invention claimed is:

1. A method for controlling a torque direction transition in a powershift transmission, comprising:
    (a) during a power-off condition, decreasing a torque capacity of a transmission input clutch when clutch slip reaches a target slip;
    (b) producing a subsequent power-on condition;
    (c) increasing torque capacity of said clutch when clutch slip reaches a second target slip.

2. The method of claim 1, wherein the target slip is a negative slip approaching zero slip.

3. The method of claim 1, wherein the target slip is a negative slip whose magnitude avoids inducing a driveline disturbance.

4. The method of claim 1, wherein:
    step (a) further comprises producing a desired torque capacity of said clutch.

5. The method of claim 1, wherein:
    step (a) further comprises producing a desired torque capacity of said clutch; and
    step (c) further comprises increasing torque capacity of said clutch to the desired torque capacity.

6. The method of claim 1, wherein:
    step (a) further comprises decreasing said torque capacity from a desired torque capacity to a target torque capacity.

7. The method of claim 1, wherein:
    step (a) further comprises decreasing torque capacity of said clutch linearly over time from a desired torque capacity to a target torque capacity.

8. The method of claim 1, wherein:
    step (c) further comprises increasing torque capacity of said clutch linearly over time from a target capacity to a desired torque capacity.

9. A method for controlling a torque direction transition in a powershift transmission, comprising:
    (a) producing a desired torque capacity of a transmission input clutch during a power-off condition;
    (b) decreasing the torque capacity of said clutch when clutch slip reaches a target slip;
    (c) producing a subsequent power-on condition;
    (d) increasing torque capacity of said clutch to the desired capacity when clutch slip reaches a second target slip.

10. The method of claim 9, wherein the target slip is a negative slip approaching zero slip.

11. The method of claim 9, wherein the target slip is a negative slip whose magnitude avoids inducing a driveline disturbance.

12. The method of claim 9, wherein:
step (b) further comprises decreasing said desired torque capacity to a target torque capacity.

13. The method of claim 9, wherein:
step (b) further comprises decreasing said desired torque capacity to a target torque capacity; and
step (d) further comprises increasing said target torque capacity to the desired torque capacity.

14. The method of claim 9, wherein:
step (a) further comprises decreasing said desired torque capacity linearly over time to a target torque capacity.

15. The method of claim 9, wherein:
step (c) further comprises increasing torque capacity of said input clutch linearly over time from a target capacity to the desired torque capacity.

16. A method for controlling a torque direction transition in a powershift transmission, comprising:
(a) producing a desired torque capacity of a transmission input clutch during a power-off condition;
(b) decreasing said desired torque capacity to a target torque capacity when clutch slip reaches a target slip;
(c) producing a subsequent power-on condition;
(d) increasing said target torque capacity to the desired capacity when clutch slip reaches a second target slip.

17. The method of claim 16, wherein the target slip is a negative slip approaching zero slip.

18. The method of claim 16, wherein the target slip is a negative slip whose magnitude avoids inducing a driveline disturbance.

19. The method of claim 16, wherein:
step (b) further comprises decreasing said desired torque capacity linearly over time to said target torque capacity.

20. The method of claim 16, wherein:
step (d) further comprises increasing said target torque capacity linearly over time to said desired torque capacity.

* * * * *